United States Patent [15] 3,673,270
Gosser [45] June 27, 1972

[54] HYDROGENATION OF 1,3,7-OCTATRIENE TO 1,6-OCTADIENE AND 1,5-OCTADIENE WITH CERTAIN CHROMIUM CARBONYL CATALYSTS

[72] Inventor: Lawrence Wayne Gosser, Wilmington, Del.
[73] Assignee: E. I. du Pont de Nemours and Company, Wilmington, Del.
[22] Filed: Dec. 11, 1970
[21] Appl. No.: 97,315

[52] U.S. Cl..................260/680 R, 260/438.5 R, 260/677 R
[51] Int. Cl.........................................C07c 5/16, C07c 11/12
[58] Field of Search ..................260/680 R, 683.9, 438.5 R, 260/666 B, 677 H

[56] References Cited

UNITED STATES PATENTS

| | | | |
|---|---|---|---|
| 3,135,776 | 6/1964 | Ecke | 260/438.5 X |
| 3,363,014 | 1/1968 | Kittleman et al. | 260/666 |
| 3,381,023 | 4/1968 | Whiting | 260/438.5 X |

Primary Examiner—Paul M. Coughlan, Jr.
Attorney—D. R. J. Boyd

[57] ABSTRACT

1,3,7-Octatriene, which can be made by the dimerization of butadiene, can be selectively hydrogenated to 1,5-octadiene and 1,6-octadiene in the presence of a chromium carbonyl catalyst such as chromium hexacarbonyl, pentacarbonyl(phosphine) chromium and tricarbonyl(arene)chromium complexes. Isomer distribution in the product can be modified by the presence of carbon monoxide. The diene products are useful comonomers for addition copolymers such as ethylene propylene/diene elastomeric copolymers, the diene-derived units forming crosslinking sites for any of the elastomers with conventional sulfur curing systems.

10 Claims, No Drawings

HYDROGENATION OF 1,3,7-OCTATRIENE TO 1,6-OCTADIENE AND 1,5-OCTADIENE WITH CERTAIN CHROMIUM CARBONYL CATALYSTS

FIELD OF THE INVENTION

This invention relates to the selective hydrogenation of 1,3,7-octatriene to 1,5-octadiene and 1,6-octadiene.

PRIOR ART

Tricarbonyl(arene)chromium complexes are known to be catalysts for hydrogenation and isomerization of diene functions in carboxylic acid derivatives. Frankel et al. [Tetrahedron Letters, No. 16, pp. 1919–1923 (1968)] have shown that conjugated diene or triene units in fatty acid esters such as methyl sorbate and methyl β-eleostearate are hydrogenated to corresponding monoene or non-conjugated diene units in the presence of tricarbonyl(methyl benzoate)chromium and similar tricarbonyl(arene)chromium complexes. They also disclose that non-conjugated diene units in the reaction mixtures are not reduced. Rejoan et al. [Proceedings of the Eleventh Coordination Chemistry Conference, Elsevier Publishing Co., New York (1968)] disclose chromium hexacarbonyl as a catalyst for hydrogenation of methyl sorbate to methyl 3-hexenoate.

SUMMARY OF THE INVENTION

The reaction of this invention is summarized by the following:

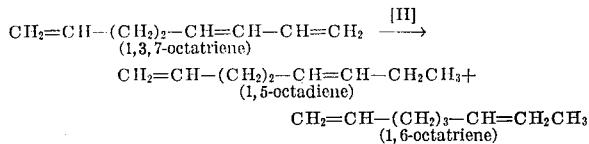

the hydrogenation being conducted in the presence of a catalytic amount of neutral chromium complex having at least three carbonyl ligands attached to each chromium atom, at a temperature of 25° to 300° C. and in the presence of hydrogen at a partial pressure of about 1 to about 1,000 atmospheres.

DETAILED DESCRIPTION OF THE INVENTION

The process of this invention is carried out conventionally by heating a mixture of 1,3,7-octatriene and the chromium carbonyl catalyst, with or without added solvent, under hydrogen in a pressure vessel. Carbon monoxide can be present in the gaseous phase if desired. The liquid reaction mixture is cooled and removed from the reactor after the pressure of hydrogen and any carbon monoxide is released. Hydrocarbon components of the reaction mixture are collected by distillation, and can be separated by conventional means such as fractional distillation.

In this reaction, 1,5- and 1,6-octadienes are the major products, the 1,6-isomer normally being predominant. Side reactions also lead to small amounts of other hydrocarbon products such as 1,3,6-octatriene, 1,3- and 2,6-octadienes, isomeric octenes and octane. The 1,6-octadiene product is essentially all in the cis stereoisomeric form, and the 1,5-octadiene is mainly in the cis form but may contain as much as 30 percent of the trans stereoisomer.

The chromium carbonyl complexes which are effective catalysts in the process of this invention are chromium hexacarbonyl, pentacarbonyl(trisubstituted phosphine)chromium compounds, and tricarbonyl(arene)chromium complexes.

The pentacarbonyl(trisubstituted phosphine)chromium complexes have the formula

wherein each L can be alike or different and consists of a hydrocarbyl group free of aliphatic unsaturation or an aryl group containing saturated hydrocarbon, lower alkoxy and halogen substituents and having up to 10 carbon atoms in the molecule.

A hydrocarbyl group is a group derived from a hydrocarbon by removal of an atom of hydrogen. Hydrocarbyl groups free of aliphatic unsaturation therefore include radicals derived from saturated hydrocarbons such as alkyl radicals, cycloalkyl radicals and bridged cycloalkyl radicals, and radicals derived from aromatic hydrocarbons containing one or more benzene rings which may be condensed, and which contain only saturated hydrocarbon substituents. Radicals derived from aromatic hydrocarbons can be classified according to whether they are formed by removal of a hydrogen from an aromatic nucleus (which are called aryl radicals), or, when the aromatic hydrocarbon contains one or more saturated hydrocarbon substituents, by removal of a hydrogen atom from a saturated carbon atom (which are called aralkyl substituents). Examples of suitable hydrocarbyl radicals include: methyl, ethyl, n-propyl, isopropyl, n-butyl, t-butyl, 2-ethylhexyl, n-octyl, 2-methyloctyl, cyclopentyl, cyclohexyl, 4-ethylcyclohexyl, benzyl, 4-methylbenzyl, 3,4-dimethylbenzyl, phenyl, tolyl, 2,4-dimethylphenyl and the like. Triaryl phosphines, especially triphenyl phosphines, are preferred.

Examples of aryl radicals containing halogen or alkoxy substituents include 4-fluorophenyl, 4-chlorophenyl, 4-bromophenyl, 4-iodophenyl, 3-chlorophenyl, 3-chloro-4-methylphenyl, 3-propyl-4-fluorophenyl, 3,5-dimethyl-4-bromophenyl, 4-methoxyphenyl, 4-ethoxyphenyl, 3-methoxy-4-methylphenyl and the like.

Tricarbonyl(arene)chromium compounds have the general formula:

$$Cr(CO)_3(Q)$$

where Q is an aromatic compound which can contain up to 14 carbon atoms and can be benzene, toluene, o-, m-, or p-xylene, ethylbenzene, mesitylene, hexamethylbenzene, p-cymene, isopropylbenzene, 1,3-di(t-butyl)benzene, naphthalene, tetralin, anthracene, phenanthrene, biphenyl, diphenylmethane, 1,2-diphenylethylene, 1,4-diphenylbutadiene, indane, fluorene and the like or such hydrocarbon with up to 3 substituents which can be lower alkoxy (—OR), lower alkanecarbonyloxy (—OCOR), lower alkoxycarbonyl (—COOR), lower alkoxycarbonylalkyl (—R—COOR), hydroxymethyl (—CH$_2$OH), cyano (—CN), lower alkylcarbonyl (—COR), arylcarbonyl (—COAr), amino (—NH$_2$), N-(lower alkyl)amino alkyl)amino (—NHR), N,N-di(lower alkyl)amino alkyl)amino (—NR$_2$), halogen and the like.

Examples of substituted aromatic hydrocarbons include fluorobenzene, chlorobenzene, anisole, ethyl phenylacetate, methyl benzoate, 2,5-dimethoxy-1,4-di-(t-butyl)benzene, benzophenone, aniline, toluidine, N-methylaniline, N,N-dimethyltoluidine, trans-1,3-diacetoxy-2,2-dimethylindane, benzyl alcohol, and the like.

The chromium carbonyl catalysts are normally used in a g. catalyst/ml triene ratio in the range of 0.001 to 1.0, and the ratio in the range of about 0.01 to about 0.2 is preferred.

The reaction can be run without an added solvent, i.e., neat or in the presence of an inert solvent such as hexane, cyclohexane, or acetone. When a solvent is used, it is recommended that the proportions of solvent and catalyst are adjusted so that the catalyst concentration in the reaction mixture, including both solvent and triene, is within the range of 0.0005 to 1 g/ml, and preferably in the range of 0.01 to 0.05 g/ml. It is also preferred to limit the solvent to an amount which allows a triene concentration of at least 10 percent in the initial reaction mixture. Inert nonpolar solvents such as hexane have negligible effects on the rate of reaction, while inert polar solvents such as acetone generally enhance the rate of reaction and may also effect changes in the relative proportions of 1,5- and 1,6- octadienes produced.

The reaction mixture may also contain ligands in excess of the amount represented by the formula of the chromium complex used as catalyst. Such ligands include carbon monoxide, methyl benzoate and benzene. Addition of carbon monoxide generally results in a reduced rate of hydrogenation while increasing the extent of isomerization of 1,3,7-octatriene to the 1,3,6-isomer. It is recommended that carbon monoxide, if used, be limited to a maximum partial pressure of about 50 atmospheres. The presence of excess arene ligands does not affect the product distribution.

The partial pressure of hydrogen in the process can be in the broad range of about 1 to about 1,000 atmospheres, and is preferably in the range of about 20 to about 100 atmospheres. The level of hydrogen pressure has nearly negligible effect on the reaction rate in the preferred pressure range, though lower levels in this range are slightly favorable to higher 1,6-octadiene/octene product ratios.

The process is conducted at temperatures in the range of 25° to 300° C. When chromium hexacarbonyl is used as the catalyst, the effective temperatures are preferably in the range of 50° to 300° C., and are most preferably in the range of 150° to 250° C. When tricarbonyl(arene)chromium complexes are used as catalysts, the effective temperatures are preferably in the range of 25° to 250° C., and most preferably in the range of 100° to 200° C.

The 1,3,7-octatriene, as used in the following examples, can be obtained conveniently by the catalytic dimerization of butadiene [cf., Takahashi et al. Bull. Chem. Soc. (Japan), 41, 454 (1968)]. The usual impurities present in triene produced by this route are 1,3,6-octatriene (minor) and 4-vinylcyclohexene (major). These impurities can be removed, but their separation from 1,3,7-octatriene by distillation is not easy. However, since 4-vinylcyclohexene is nearly inert in the process of the invention and can be separated readily from 1,5- and 1,6-octadienes by fractional distillation, its presence in the reaction mixture is not a disadvantage. In fact, the presence of 4-vinylcyclohexene may be desirable because it appears to inhibit formation of by-product octenes and octane.

SPECIFIC EMBODIMENTS OF THE INVENTION

The following examples illustrate the process of the invention. The tricarbonyl(methyl benzoate)chromium catalyst shown in Examples 1–23 was prepared from chromium hexacarbonyl and methyl benzoate by the procedure of Nicolls and Whitting, J. Chem. Soc., 551 (1959). The pentacarbonyl(triphenylphosphine)chromium catalyst shown in Examples 40–42 was prepared by a procedure analogous to that described for the preparation of corresponding isonitrile complexes by Murdoch and Henzi, J. Organometal. Chem. 5, 166 (1966).

EXAMPLE 1

A solution of 3.0 ml of 1,3,7-octatriene (75 percent 1,3,7-octatriene, with 4-vinylcyclohexene and 1,3,6-octatriene impurities) in 25 ml of pure cyclohexane and 0.20 g of tricarbonyl(methyl benzoate)chromium were placed in a reactor lined with Hastelloy C. The closed reactor was successively cooled in a dry ice bath, evacuated to about 1 mm Hg, warmed to room temperature and filled with hydrogen to a few hundred psig. The reactor was then heated at 200° C. with agitation while the hydrogen pressure was raised to and maintained at 1,200 psig for 6 hours. Flash distillation of the reaction mixture under reduced pressure gave 18 g of product solution. Gas chromatography with a ⅛ inch × 25 feet 5 percent butanediol succinate column at 78° C. and thermal conductivity detection showed the absence of 1,3,7-octatriene. The major product peaks were at the retention times of 1,5- and 1,6-octadienes.

EXAMPLES 2–42

These examples were conducted by the procedure of Example 1, and the data are presented in Table I. The gas chromatographic data show relative proportions in "area" percent which closely approximate weight percent (cf., Purnell "Gas Chromatography", John Wiley and Sons, Inc., 285 (1962).

Gas chromatographic analyses of all products were carried out with the butanediol succinate column described in Example 1. In some instances the products were also analyzed by each of two other columns. When all three columns were used, the data in Table I are composite results. The two other columns are as follows:

a. A ⅛ inch × 15 feet column packed with 80–100 mesh gas Chrom RA containing 20 percent of $\beta, \beta'$-oxydipropionitrile, using thermal conductivity detection.

b. A 50 feet capillary column coated with solid polyphenyl ether, using flame ionization detection.

The columns were calibrated and found to have somewhat different separation characteristics. They all readily separated 1,5-octadiene, 1,6-octadiene, 4-vinylcyclohexene and 1,3,7-octatriene from each other. However, possible contaminants such as the octenes, isomeric octadienes and isomeric octatrienes could not be separated clearly in all instances. An analysis of their combined capabilities with representative samples indicate the following:

Butanediol succinate column
  Data are reliable with recognition that the 1,5-octadiene fraction may contain 2-octene and some 1,4- and 1,7-octadienes, and that the 4-vinylcyclohexene fraction may contain 1,3-octadiene. Infrared analysis of the 1,5-octadiene fraction shows that the 1,4- and 1,7-isomers are minor components.

Composite of all three columns
  Data are reliable with recognition that the 1,5-octadiene fraction may contain small amounts of 1,4- and 1,7-octadiene and that the 4-vinylcyclohexene fraction may contain 1,3-octadiene.

TABLE I

[Hydrogenation of 1,3,7-octatriene with soluble chromium catalysts]

| Example | Catalyst ~g. | Solvent ~ml. | 1,3,7-OT [a] ~ml. | Temp, °C. | Time, hr. | $H_2$/CO [b] p.s.i.g. | Col.[c] | 1,5-OD | 1,6-OD | 4VCH | 1,3,7-OT |
|---|---|---|---|---|---|---|---|---|---|---|---|
| 2 | A~0.20 | None | 77%~9 | 160 | 6 | 300 | BDS | 11 | 60 | 22 | 2 |
| 3 | A~0.20 | ...do... | 77%~9 | 160 | 6 | 1,250 | COMP | 11 | [d] 64 | [d] 22 | |
| 4 | A~0.20 | $C_6H_{12}$~8 | 89%~1 | 100 | 6 | 13,000 | BDS | | | 11 | 89 |
| 5 | A~0.070 | $C_6H_{12}$~8 | 99%~0.8 | 140 | 6 | 1,200 | BDS | 28 | [d] 47 | | 9 |
| 6 | A~0.40 | $C_6H_{12}$~8 | 98%~1 | 140 | 6 | 1,200 | BDS | 6.8 | 27 | | 63 |
| 7 | A~0.020 | $C_6H_{12}$~25 | 89%~3 | 150 | 6 | 1,270 | BDS | 1 | 2 | 11 | 86 |
| 8 | A~0.20 | $C_6H_{12}$~8 | 99%~2 | 150 | 6 | 1,200 | COMP | 34 | 54 | | 1 |
| 9 | A~0.20 | $C_6H_{12}$~8 | 89%~1 | 150 | 6 | 1,300 | BDS | 21 | 65 | 10 | 1 |
| 10 | A~0.20 | $C_6H_{12}$~8 | 89%~1 | 160 | 6 | 290 | BDS | 17 | 52 | 10 | 16 |
| 11 | A~0.40 | $C_6H_{12}$~25 | 99%~3 | 165 | 6 | 1,200 | BDS | [d] 31.5 | [d] 60.4 | | 2 |
| 12 | A~0.40 | $C_6H_{12}$~8 | 98%~1 | 165 | 6 | 1,200 | BDS | [d] 30 | [d] 55 | | 9 |
| 13 | A~0.20 | $C_6H_{12}$~8 | 89%~1 | 200 | 6 | 1,250 | COMP | 8.5 | 13.9 | 1 | 0.5 |
| 14 | A~0.20 | $C_6H_{12}$~8 | 89%~1 | 150 | 6 | 1,230/25 | BDS | | | 11 | 88 |
| 15 | A~0.20 | $C_6H_{12}$~8 | 89%~1 | 150 | 6 | 1,300/65 | BDS | 1 | 2 | 13 | 84 |
| 16 | A~0.20 | $C_6H_{12}$~8 | 89%~1 | 175 | 6 | 1,220/15 | BDS | 4 | 11 | 13 | 67 |
| 17 | A~0.20 | $C_6H_{12}$~8 | 89%~1 | 200 | 6 | 1,300/25 | COMP | 6.7 | 40 | 14 | 22 |
| 18 | A~0.20 | $C_6H_{12}$~8 | 89%~1 | 250 | 6 | 1,000/65 | BDS | | [d] 43 | 11 | 12 |
| 19 | A~0.20 | $C_6H_{12}$/MB~8/0.5 g | 89%~1 | 160 | 6 | 290 | BDS | 21 | 63 | 10 | 3 |
| 20 | A~0.20 | $C_6H_{12}$/MB~8/0.5 g | 89%~1 | 200 | 6 | 1,300/30 | BDS | 11 | 50 | 10 | 17 |
| 21 | A~0.20 | n-$C_6H_{14}$~8 | 89%~1 | 150 | 6 | 1,220 | BDS | 21 | 66 | 10 | 2 |

TABLE I (Continued)

[Hydrogenation of 1,3,7-octatriene with soluble chromium catalysts]

| | Reaction mixture | | | Conditions | | | | GC analysis | | | |
|---|---|---|---|---|---|---|---|---|---|---|---|
| Example | Catalyst ~g. | Solvent ~ml. | 1,3,7-OT [a] ~ml. | Temp, °C. | Time, hr. | $H_2$/CO [b] p.s.i.g. | Col.[c] | 1,5-OD | 1,6-OD | 4VCH | 1,3,7-OT |
| 22 | A~0.20 | Acetone~8 | 89%~1 | 36 | 6 | 1,200 | BDS | 5 | 4 | 12 | 76 |
| 23 | A~0.20 | Acetone~8 | 89%~1 | 100 | 6 | 1,200 | BDS | 24 | 64 | 10 | |
| 24 | B~0.020 | None | 77%~9 | 200 | 6 | 1,200 | COMP | 9.9 | 56 | 22 | 1 |
| 25 | B~0.020 | do | 77%~9 | 225 | 6 | 1,400 | BDS | 28 | 31 | 12 | 2 |
| 26 | B~0.20 | do | 77%~9 | 200 | 6 | 245 | COMP | 9 | [d]65 | [d]19 | |
| 27 | B~0.20 | do | 77%~9 | 200 | 6 | 1,300 | BDS | 16 | 57 | 9 | 17 |
| 28 | B~0.20 | $C_6H_{12}$~8 | 89%~1 | 200 | 6 | 1,000 | BDS | 23 | 56 | 9 | 1 |
| 29 | B~0.20 | $C_6H_{12}$~8 | 77%~1 | 200 | 6 | 1,300 | BDS | [d]13 | [d]62 | 19 | 1 |
| 30 | B~0.20 | $C_6H_{12}$~8 | 99%~1 | 200 | 6 | 1,300 | COMP | [d]23 | [d]65 | 0.5 | 1 |
| 31 | B~0.20 | $C_6H_{12}$~8 | 89%~1 | 200 | 6 | 1,300/25 | BDS | 6 | 46 | 11 | 21 |
| 32 | B~0.20 | $C_6H_{12}$~8 | 89%~1 | 200 | 6 | 1,400/100 | BDS | 6 | 9 | 13 | 56 |
| 33 | B~0.20 | $C_6H_{12}$~8 | 89%~1 | 275 | 6 | 1,240/200 | Comp | 9.6 | 33 | 15 | 17 |
| 34 | B~0.20 | $C_6H_{12}$~8 | 59%~1 | 80 | 12 | 1,200 | BDS | 5 | 3 | 10 | 80 |
| 35 | B~0.20 | Acetone~8 | 89%~1 | 150 | 6 | 1,200 | COMP | 3 | [d]70 | 13 | 4 |
| 36 | B~0.20 | do | 89%~1 | 130 | 6 | 1,200 | COMP | [d]22 | 5 | 2 | [d]69 |
| 37 | C~0.20 | $C_6H_{12}$~8 | 99%~2 | 140 | 8 | 1,300 | COMP | [d]22 | [d]24 | 1 | [d]50 |
| 38 | C~0.20 | $C_6H_{12}$~8 | 99%~2 | 160 | 6 | 1,500 | COMP | [d]20 | [d]40 | 21 | 5 |
| 39 | C~0.20 | $C_6H_{12}$~8 | 77%~1 | 140 | 8 | 1,250 | COMP | 20 | 3 | 12.5 | 62 |
| 40 | C~0.20 | $C_6H_{12}=C_6H_6$~8=1 | 89%~2 | 200 | 6 | 1,225 | COMP | 8 | 59 | 22 | 2.5 |
| 41 | D~0.40 | $C_6H_{12}$~8 | 77%~1 | 210 | 6 | 1,400 | COMP | 14 | 52 | 17 | 1 |
| 42 | D~0.40 | $C_6H_{12}$~8 | 89%~1 | 225 | 6 | 1,300 | COMP | 17 | [d]42 | 9 | 2 |

[a] The other component is 4VCH.
[b] CO pressure, when shown, is the initial pressure at 25° C.
[c] BDS indicates data from butanediol succinate column only. COMP indicates composite data from three different columns. See text for explanation.
[d] The materials in these instances were also isolated by preparative GC and their identities verified by NMR.

NOTES.—Abbreviations, MB=methyl benzoate; OT=octatriene, OD=octadiene; 4VCH=4-vinylcyclohexene; 1,3,7-OT =1,3,7-octatriene; A=tricarbonyl-(methyl benzoate)chromium; B=chromium hexacarbonyl; C=tricarbonyl(benzene)chromium; D=pentacarbonyl(triphenylphosphine)chromium.

The 1,5- and 1,6-octadienes produced by the process of this invention are useful as comonomers in the preparation of vinyl polymers. Polymers containing the copolymerized dienes can be cured by conventional means such as vulcanization. A particularly valuable use of the dienes is in elastomeric ethylene/propylene/diene copolymers, which are well known in the form of commercial EPR rubbers. In this specific use, 1,5- or 1,6-octadiene can be used in place of 1,4-hexadiene, which is well established as a cure-site-introducing comonomer in EPR elastomers.

The embodiments of the invention in which an exclusive property or privilege is claimed are defined as follows:

1. Method of making 1,5-octadiene and 1,6-octadiene which comprises contacting at a temperature in the range of 25° to 300° C., 1,3,7-octatriene with hydrogen at a partial pressure of about 1 to 1,000 atmospheres in the presence of a catalytic amount of a catalyst consisting of a neutral complex of chromium containing at least three carbonyl ligands joined to each chromium atom.

2. Method of claim 1 in which said catalyst is selected from

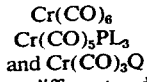

$Cr(CO)_6$
$Cr(CO)_5PL_3$
and $Cr(CO)_3Q$ wherein each L is alike or different and is a hydrocarbyl group free of aliphatic unsaturation, or an aryl group having up to three substituents consisting of halogen, lower alkoxy and saturated hydrocarbon, said L having up to 10 carbons selected, and Q is an aromatic compound of up to 14 carbons selected from aromatic hydrocarbons, or such aromatic hydrocarbons having up to three substituents consisting of lower alkoxy lower alkanecarbonyloxy, lower alkoxycarbonyl, lower alkoxycarbonylalkyl, hydroxymethyl, cyano, lower alkylcarbonyl, arylcarbonyl, amino, N-(lower alkyl)amino, N,N-di(lower alkyl)amino and halogen.

3. Method of claim 2 in which said reaction is conducted at a temperature in the range of 100° C. to about 200° C.

4. Method of claim 2 in which the catalyst is present in an amount of 0.01 to 0.2 grams per ml. 1,3,7-octatriene.

5. Method of claim 2 in which said catalyst is tricarbonyl(methyl benzoate)chromium.

6. Method of claim 2 in which said catalyst is tricarbonyl(benzene)chromium.

7. Method of claim 2 in which said catalyst is hexacarbonyl chromium.

8. Method of claim 2 in which said catalyst is pentacarbonyl(triphenylphosphine)chromium.

9. Method of claim 2 in which reaction is conducted at a temperature in the range of 150° to 250° C.

10. Method of claim 9 in which the catalyst is present in an amount of 0.01 to 0.2 grams per ml. 1,3,7-octatriene.

* * * * *

PO-1050
(5/69)

UNITED STATES PATENT OFFICE
CERTIFICATE OF CORRECTION

Patent No. 3,673,270　　　　Dated　June 27, 1972

Inventor(s)　Lawrence Wayne Gosser

It is certified that error appears in the above-identified patent and that said Letters Patent are hereby corrected as shown below:

Cover page, Abstract, lines 4 and 5, "pentacarbonyl(phosphine" should be -- pentacarbonyl(trisubstituted phosphine)chromium --;

Col. 2, lines 45 and 46, in two instances the words "alkyl)amino" occurring after "(lower alkyl)amino" should be deleted;

Col. 6, Table I, Example 38, in the column under "1,6-OD" the number "40" should be -- 44 --; and in the column under "1,3,7-OT", the number "5" should be changed to -- 4 --.

Signed and sealed this 9th day of January 1973.

(SEAL)
Attest:

EDWARD M. FLETCHER, JR.　　　　ROBERT GOTTSCHALK
Attesting Officer　　　　　　　　Commissioner of Patents